United States Patent [19]
Mathur et al.

[11] Patent Number: 5,408,406
[45] Date of Patent: Apr. 18, 1995

[54] NEURAL NET BASED DISTURBANCE PREDICTOR FOR MODEL PREDICTIVE CONTROL

[75] Inventors: Anoop K. Mathur, Shoreview, Minn.; Ravi S. Gopinath, Troy, N.Y.

[73] Assignee: Honeywell Inc., Minneapolis, Minn.

[21] Appl. No.: 133,542

[22] Filed: Oct. 7, 1993

[51] Int. Cl.[6] .............................................. G05B 13/02
[52] U.S. Cl. ...................... 364/163; 364/149; 364/158; 364/160; 395/903
[58] Field of Search ................ 364/148, 165, 176, 177, 364/180; 395/21-23, 903-910

[56] References Cited

U.S. PATENT DOCUMENTS

| | | | |
|---|---|---|---|
| 5,159,660 | 10/1992 | Lu et al. | 395/22 |
| 5,268,834 | 12/1993 | Sanner et al. | 364/151 |
| 5,268,835 | 12/1993 | Miyagaki et al. | 364/151 |

FOREIGN PATENT DOCUMENTS 4-326101  11/1992  Japan ................ 364/164

OTHER PUBLICATIONS

"Neural Networks-a Tutorial for the Power Industry", by Anoop Mathur and Tariq Samad, Proceedings of the American Power Conference, 1990.

"Artificiall Neural Networks in Process Estimation and Control", by Willis, et al, Automatica vol. 28 No. 6, 1181–1187.

"A New Scheme Combining Neural Feedforward Control with Model Predictive Control", by Lee, et al, AIChE Journal, Feb. 92, vol. 38, No. 2.

"Neural Net Based Model Predictive Control", by Saint-Donat, et al, Int. J Control, 1991, vol. 54 No. 6, 1453–1468.

Primary Examiner—Roy N. Envall, Jr.
Assistant Examiner—Steven R. Garland
Attorney, Agent, or Firm—John G. Shudy, Jr.

[57] ABSTRACT

A control loop for controlling a process or plant which controls the process or plant via an actuator. The control loop receives from the process or plant a signal representative of the process or plant output. The loop includes a nominal controller that generates a control signal for the actuator which is used only in the absence of a predicted disturbance to the process or plant signal from a disturbance mode controller unit having a neural network conditioned for predicting and indicating a disturbance.

5 Claims, 3 Drawing Sheets

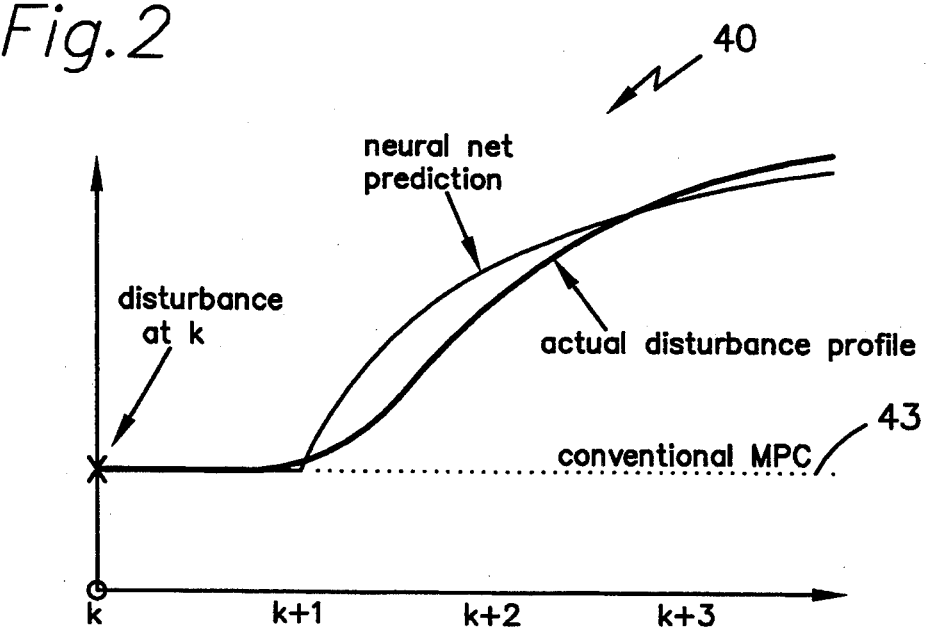
(a) prediction at k
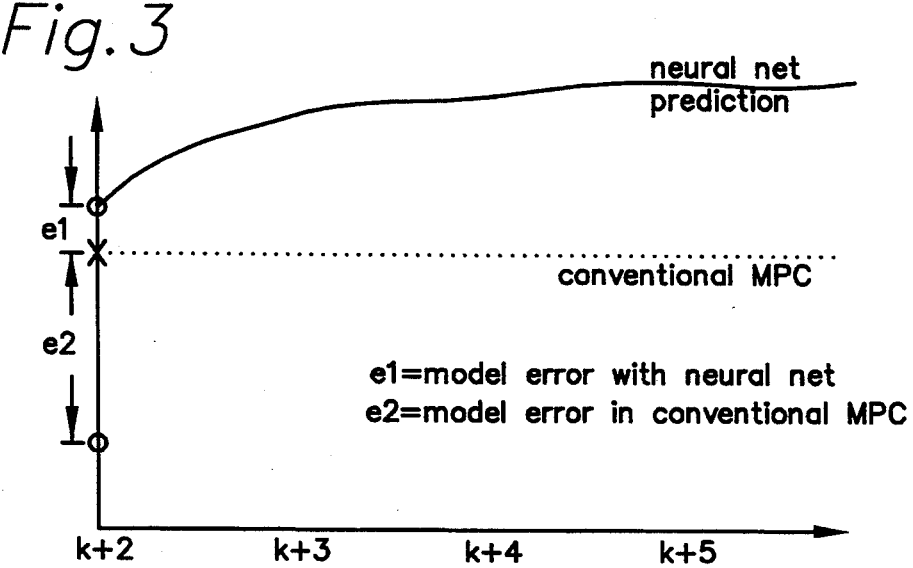
(b) prediction at k+2
Schematic comparison of disturbance prediction with and without a neural network

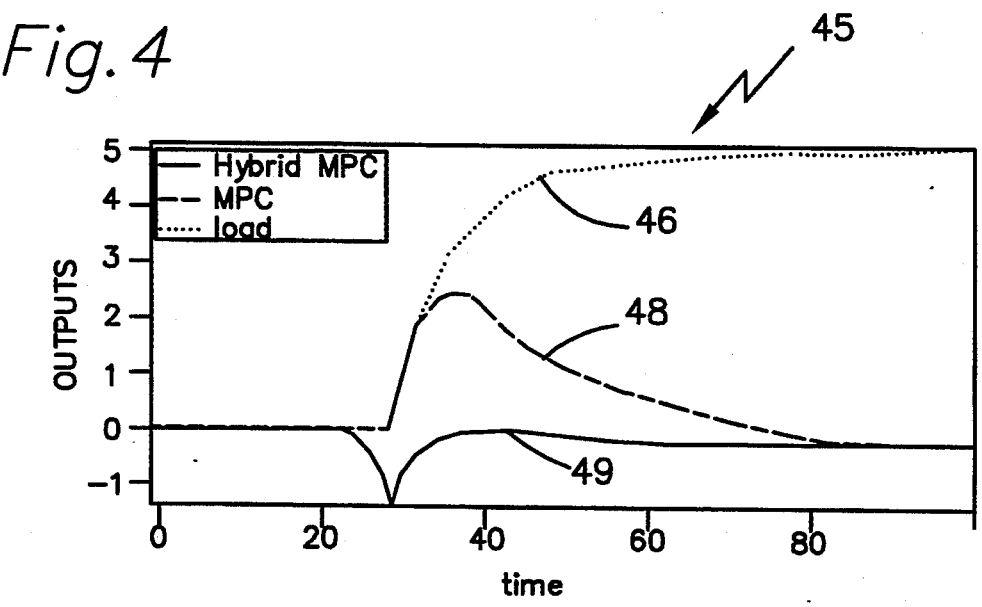
(a) Out and load variable profile
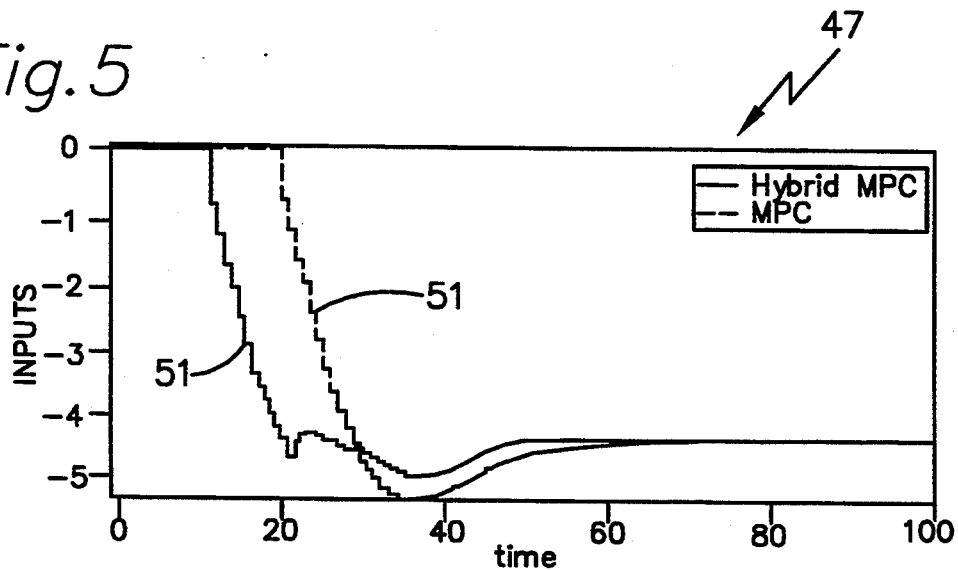
(b) Manipulated variable profile
Comparison of disturbance rejection using hybrid MPC and conventional MPC. Advance compensation with the hybrid controller leads to better disturbance rejection.

NEURAL NET BASED DISTURBANCE PREDICTOR FOR MODEL PREDICTIVE CONTROL

BACKGROUND OF THE INVENTION

This invention is particularly useful for controlling plants and processes of various kinds, where some regularly occurring disturbance affects the output of the plant or process. As the ordinary worker in the field of controls will readily recognize the invention described herein as application to any field of control technology from heating, ventilation and air conditioning systems to chemical processing plants, navigational systems, and so on.

A method is described which provides, in the preferred embodiment, using a model based predictive control framework to improve regulatory performance, particularly those processes that are subject to periodic or cyclic disturbances.

Such examples might include temperature disturbances affecting distillation columns (in oil refineries) due to ambient temperature variations over the course of a day (solar cycle), continuous grinding mills subject to feed disturbances near feed-bin changeover times, etc.

Perhaps the primary benefit to using a model that predicts disturbances in feeding this information into the control loop is that processes which are controlled in this way can perform more closely to their constraints. Using the example of a continuous grinding mill, the neural network would be trained on plant data indicating that (using this example) required power consumption to the grinders occurs each time a new ore car is unloaded into the process. Based on the grinding rate, or the size of the ore car, or some other criteria known to the plant operator, a neural net can be trained to expect the occurrence in the change in power requirement for the grinder.

There are many other examples which could be cited for using inventions of this type to improve the performance of the process under control and increase yield by allowing operation of the plant close to the equipment constraints.

Model-based predictive control (MPC) techniques have gained widespread acceptance in the process industry over the past decade due to their ability to achieve multi variable control objectives in the presence of dead time, process constraints and modeling uncertainties. A good review of various MPC algorithms can be found in "Model Predictive Control: Theory and Practice—A Survey", *Automatica* 23 (3), (1989), Garcia, Pret, & Morari. In general, these algorithms can be considered optimal control techniques which compute control moves as a solution to an optimization problem to minimize an error subject to constraints, either user imposed or system imposed.

In general, an MPC algorithm can be described with reference to the multivariable process. For example, one modeled by the equations:

$$x = f(x, u) \tag{1a}$$

$$y = g(x, u) \tag{1b}$$

wherein x is the state variable vector, u is the manipulated variable vector and y is the output variable vector.

There are two broad steps: a prediction step and an optimization step. In the prediction step, at every time step (k), the model is used to predict the plant output over a number of future intervals. This is called the prediction horizon. This prediction is corrected by adding the difference in the outputs from the plant and the model to the predicted output. The predicted output is then subtracted from the desired output trajectory over the prediction horizon to give the predicted error. In the optimization step, the minimization of the predicted error subject to the constraint(s) is performed (usually by a least squares minimization, although other techniques may be used) with the computer control moves being the decision variables. Constraints are specified as direct bounds on the decision variables (called manipulated variable constraints) or as constraint equations, usually based on the process model (output constraints). The first computed control move is implemented on the plant and model, then the steps are repeated for the next time step k. It is within the contemplation of the invention that one or all constraint variables of the one or all constraints are predicted.

It is important to know that in the above procedure, feedback information is utilized. At each and every time step this is used again and again to correct the predictions. However, in conventional MPC schemes it is assumed that the current measured disturbance remains constant over the entire prediction horizon because there is no process information in the future. This is called a constant additive disturbance assumption. It is well known that conventional MPC is a special case of the linear quadratic formulation. Looking at the MPC in a linear quadratic framework, the constant additive disturbance assumption suggests that all disturbances effecting the process are random steps that effect each output independently. In many, if not most, applications, this adversely effects the regulatory performance of a standard MPC controller. To counter this linear quadratic formulation, researchers have used a Kalman filter design to obtain estimates of the states and hence the predicted outputs. A review of known methods for dealing with this is provided in the reference "Model Predictive Control: State of the Art" CPC IV-Proceedings of the 4th International Conference on Chemical Process Control, Padre Island, Tex., pp. 271–296 (1991), Ricker.

A combination of an MPC controller with the neural network as explained in this invention provides for a substantial improvement in overall controller design. It may be referred to herein as a Hybrid controller which may include other controller types besides the MPC), or a Hybrid MPC controller.

BRIEF DESCRIPTION OF THE DRAWINGS

FIGS. 2 and 3 are graphs of disturbance prediction of the trajectory of y compared to the trajectory of y built into the nominal controller, preferably the MPC type, all in accord with the preferred embodiments of the invention.

FIG. 4 is a graph of the output and load variable trajectories for the conventional MPC and the Hybrid predictive/MPC controllers.

FIG. 5 is a graph of the manipulated variable trajectory for the Hybrid and MPC controllers corresponding to FIG. 4 in time.

SUMMARY OF THE INVENTION

Figure 1:
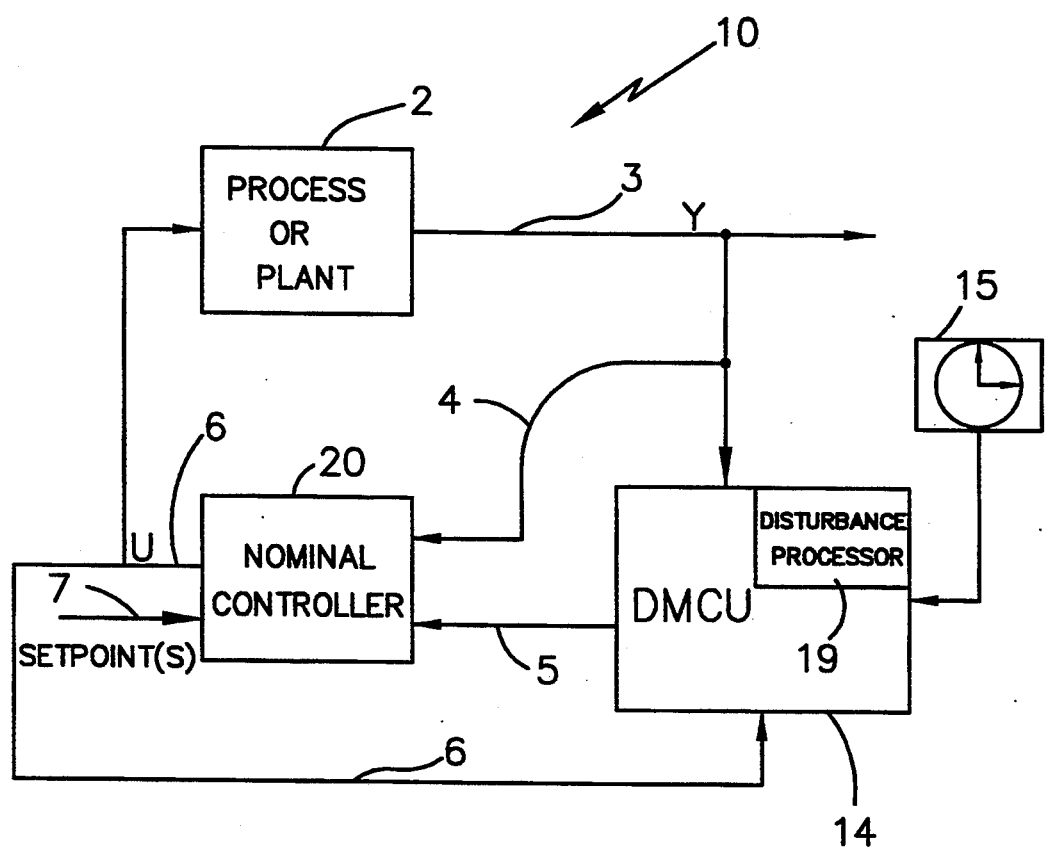
FIG. 1 is a block diagram of a hybrid predictive/nominal control loop, including the processing plant in accord with the preferred embodiment of the invention.

This invention provides for a controller for controlling a process which has an output signal which controls the process through an actuator that's associated therewith. The controller also receives as input a signal representative of the plant or process output.

In a minimum configuration, the invention requires a nominal controller which in the preferred embodiment is an MPC controller that generates an output which can be used for the controller output signal but which output is only used by the process in the absence of predicted disturbances to the process.

The controller also has a disturbance mode controller unit which determines whether a disturbance model output should supplement a nominal controller output to generate a controller output signal to the plant. Of course, a disturbance predictor unit in the preferred embodiment having a trained neural network, understands the likelihood of expected disturbances or disturbance patterns and produces output calculated to adjust the process to setpoint as the disturbance occurs.

The disturbance mode controller unit employs the signal from the disturbance predictor unit as well as the plant or process output signal in a comparative manner. By making a comparison over a selected period of time the disturbance controller unit determines whether or not a disturbance is actually occurring and, if one is not occurring, returns control to the nominal controller for the plant.

Variations of the invention include the use of an on/off output from the disturbance model in the neural network, or several disturbance models, each of which have an output to the disturbance mode controller unit which uses the difference between the plant output signal and the predictive information from the various disturbance models to determine which of them, if any, to use to supplement the nominal controller output.

DETAILED DESCRIPTION OF THE PREFERRED EMBODIMENT

Referring first to FIG. 1, a control loop having a hybrid predictive/nominal controller therein is indicated by the numeral 10. In the preferred embodiment the nominal controller is in box 20 and is of the MPC variety and the predictive controller (DMCU 14) is a neural network trained on the inputs and outputs in the loop 10 and a disturbance model relevant to the plant or process 2. The plant or process 2 can be anything controlled by a controller, as would be well understood by those of ordinary skill in this art.

The output of the plant appears on line 3 which, in the vernacular of the industry, is considered a signal representative of its output, also and more commonly known generally as "y". ("y" can be an output variable or a set of output variables. In one case, where only the disturbance affected variable is affected, no part of the y output is sent to the nominal controller. In most complex controlled systems, other output variables will exist that will influence the nominal controller. See the Air Conditioner example in the Detailed Description for more detail about "y".) This indicator of plant or process output is fed to the disturbance processor 19 as well as the controller box 20. The output of the nominal controller is on line 6. The disturbance processor 14 is preferably a neural network trained to understand either with reference to time 15 or some other periodicity indicator, when and to what extent the disturbance is expected to occur. If the periodicity of the disturbance is related to y then y may be the only input necessary for the DMCU 14 (Disturbance Mode Controller Unit). The output of the DMCU 14 appears on line 5.

There are several different ways in which this control by the DMCU can be achieved. In a preferred embodiment, the predictive model or neural network looks at the plant output y and compares it with the expected plant output occurring prior to the event of an oncoming disturbance. Based on the input(u)/output(y) data used to train the neural net, its output (which will appear on line 5) can be used to predict one or more affected control variables or one or more constraint variables, each represented in its own controller within the main controller block 20. Another preferred embodiment can also use the input of an external event, such as that of the movement of time, here illustrated as input from clock block 15.

A short discussion of constraint and control variables is in order here. A constraint variable is one on which the limits of machine performance lie. For example, a fan can only turn at a range of revolutions per minute, and is constrained beyond that range. A feed pipe can only allow a certain volume of fuel to pass through it in a given amount of time and is thus constrained by a flow rate variable. A control variable is one which the controller can affect, such as the size of the opening of a valve, for example, or the directly related rate of flow through an associated pipe. Thus a constraint variable may also be affected by a control variable.

The output of the trained neural net 5(or other predictive model if one other than a neural net is used) simulates the disturbance affecting the process over the prediction horizon at each time step. This output 5 may take any form compatible with the form of the controller box 20. Ordinarily in the preferred embodiment the output is the prediction vector profile of the constraint variable based on the disturbance model the DMCU was trained on (or based on the disturbance model and computational iterations if a computational DMCU is used rather than a neural net). If the predicted disturbance does not materialize, the neural network will respond to that fact because the output y will not be as predicted. When the dissonance with the trained in model becomes apparent to the neural net, it will remove the expected disturbance profile from its output, and if properly trained, can also remove the effects of its error, by compensating output. In a computational DMCU, a monitor will need to be established that checks the output y for some predetermined time to determine whether the disturbance predicted by the iterative model has occurred, and some other model for corrective action could also be added on the nonoccurrence of a predicted disturbance.

In the real-world application of this to a control situation, say to an air conditioning system, the DCMU would be programmed or trained to expect the occurrence of substantial and increasing heat load during the day, and subsequent decreasing heatload as the sun headed for the horizon in the west. If the day is very overcast, the predicted disturbance will not develop and the DMCU will notice this, since the output of the air conditioned space will not show the expected rise in temperature for the no control move situation (or, of course, the flat or decreasing temperature level of the conditioned space with the addition of the disturbance predicted control response situation).

This example is a case where the only output "y" may be temperature of the space. Where this is the case, using FIG. 1, line 4 should not provide any information to the nominal controller. However if the nominal controller were to account for humidity, the "y" output of the space representing humidity (which, let us assume, is not related to the predicted disturbance that the DMCU accounts for) is connected as input to the Nominal Controller but this humidity signal does not, in this example, get sent to the DMCU.

An alternative preferred embodiment would send either a "I predict a disturbance" signal or, in the alternative, a "no disturbance is predicted" signal on line 5. In implementation this would be a logical 0 or logical 1. In such an implementation, the disturbance and non-disturbance responses would have to be programmed or trained into the nominal controller 20, in which case it would not look like a standard MPC controller, rather it would be able to send out an appropriate u for the case where a disturbance exists or where one does not, in response to the DMCU input from line 5. Numerous similar variants can easily be constructed by one of ordinary skill in the art once the basic idea of supplementing a standard controller with the predicted output y expected from a predicted disturbance. In other words, it is believed to be an incorporated invention to place a model of the effect of a potential disturbance into the controller block 20, and have the DMCU merely predict its occurrence. The function of an external clock like that in block 15 in FIG. 1 could be to provide an additional input besides the output y from the plant for such systems to predict the coming of a disturbance.

Training for neural networks to accomplish these tasks is not difficult but should be done, preferably in simulation representative of the situation into which one wishes to place the inventive controller. Background literature that demonstrates that this is within the competence of those of ordinary skill includes "Neural Networks—A Tutorial for the Power Industry," Proceedings of the American Power Conference, 1990, Mathur and Samad, and the literature cited therein.

FIGS. 2-5 describe the profiles or trajectories of the relevant variables on the occurrence of a disturbance. Referring first to FIG. 2, the disturbance D occurs at time=k, the origin of the graph 40. This graph 40 is of the prediction of the output u from the controller in the loop. The dotted line 43 shows no response to the predicted disturbance at time k because it has not yet affected the output y from the plant or process. This line 43 represents the prediction the conventional MPC would produce at time k. By allowing the conventional controller to employ the y predicted by the predictive DMCU, the output u will follow line 41. The actual variance from setpoint is described by line 42.

In FIG. 3, the same graph moves to (or is redrawn with the origin at) time k+2. The disturbance is noticed by the conventional MPC (without a DMCU, as in the prior art MPC). Thus it's response is shown as line 44, anticipating a control move with a model error e2. The model error of e1 at time k+2 for the MPC configured with a predictive DMCU in accord with this invention is in addition to the error e2, allowing the model corrected by the neural net disturbance predictor to bring the process or plant to setpoint 7 in a more timely manner, assuming the occurrence of the actual disturbance is close to the predicted one.

FIG. 4 shows the output and load profiles in graph 45. The hybrid MPC (in accord with the invention) produces the plant output profile of line 49, because it knows (predicts because of its training or model) the coming occurrence of the increasing load line 46. The conventional MPC will produce a plant output profile of line 48 because it takes it until the disturbance has occurred to respond. Thus it can easily be seen that the disturbance response (known as disturbance rejection) is for most situations better for the inventive hybrid MPC than for the conventional MPC when the predicted disturbance to the load occurs.

In FIG. 5 the graph 47 again demonstrates the relative efficiencies of the hybrid MPC and the conventional, although this time with respect to controller output u. line 51 represents the u output for the hybrid MPC in accord with the invention and the line 51 represents the u output of the conventional MPC, in response to the load change profile in FIG. 4, line 46. FIGS. 4 and 5 are both drawn on the same time scale.

The invention thus described is taken as limited only by the following claims.

What is claimed is:

1. A control loop for controlling a process having an output signal to control the process having an actuator, connected to the actuator for effecting control of the process, the control loop having an input signal representative of the process output, said control loop comprising:

a nominal controller, having a first output for controlling, and connected to, the actuator, having a first input for receiving a signal representative of a process output, second input and third inputs, a disturbance mode controller unit (DMCU) having a first input for receiving a signal representative of the process output, having a second input connected to the first output of said nominal controller, having an output connected to the second input of said nominal controller, and having a third input; and a periodicity indicator having an output connected to the third input of said disturbance mode controller unit; and wherein:

said disturbance mode controller unit comprises a disturbance predictor unit having a neural network which contains likelihoods of expected disturbances with reference to said periodicity indicator, and in view of the signal representative of the process output at the first input of said disturbance mode controller unit and the first output of said nominal controller for controlling the actuator, at the second input of said disturbance mode controller unit, to predict a time and extent of an expected disturbance, and provides on the output of said disturbance mode controller unit a signal indicative of any predicted imminent disturbance, which enters the second input of said nominal controller; and said nominal controller, having a setpoint signal at the third input of said nominal controller and the signal representative of the process output at the first input of said nominal controller to generate the output for controlling the actuator, in absence of the signal indicative of any imminent disturbance, and in presence of the signal indicative of any imminent disturbance, the said nominal controller generates its output from the signal indicative of any imminent disturbance from said disturbance mode controller unit, for controlling the actuator.

2. A control loop as set forth in claim 1 wherein said DMCU employs a signal from said disturbance predictor to said nominal controller output for a period of time selected by a user unless the process output varies from the setpoint by a user selected amount within said user selected time period.

3. A controller as set forth in claim 1 wherein the DMCU is a neural network trained in simulation on expected disturbance models.

4. A controller as set forth in claim 1 wherein a DMCU output is a signal indicating only whether or not a disturbance is predicted.

5. A controller as set forth in claim 1 wherein a DMCU output is a signal indicating the profile of y predicted by the DMCU, wherein Y is at least one output variable vector.

* * * * *